United States Patent
Bright (10) Patent No.: US 9,177,004 B2
(45) Date of Patent: Nov. 3, 2015

(54) BALANCING DATA ACROSS PARTITIONS OF A TABLE SPACE DURING LOAD PROCESSING

(75) Inventor: Randol K. Bright, Austin, TX (US)

(73) Assignee: BMC SOFTWARE, INC., Houston, TX (US)

( * ) Notice: Subject to any disclaimer, the term of this patent is extended or adjusted under 35 U.S.C. 154(b) by 856 days.

(21) Appl. No.: 12/626,109

(22) Filed: Nov. 25, 2009

(65) Prior Publication Data

US 2011/0125745 A1    May 26, 2011

(51) Int. Cl.
*G06F 7/00* (2006.01)
*G06F 17/00* (2006.01)
*G06F 17/30* (2006.01)

(52) U.S. Cl.
CPC .... *G06F 17/30339* (2013.01); *G06F 17/30306* (2013.01)

(58) Field of Classification Search
CPC ................ G06F 17/30306; G06F 17/30339; G06F 3/0643; G06F 3/0644; G06F 12/0848; G06F 9/5077
USPC ......... 707/602, 609, 687, 713, 736, 758, 781, 707/802
See application file for complete search history.

(56) References Cited

U.S. PATENT DOCUMENTS

| 5,222,235 | A | 6/1993 | Hintz et al. | |
|---|---|---|---|---|
| 6,269,375 | B1 * | 7/2001 | Ruddy et al. | 1/1 |
| 7,003,508 | B1 * | 2/2006 | Shatdal | 1/1 |
| 2003/0004938 | A1 * | 1/2003 | Lawder | 707/3 |
| 2008/0235397 | A1 * | 9/2008 | Degenaro et al. | 709/241 |
| 2009/0171885 | A1 * | 7/2009 | Silberstein et al. | 707/2 |
| 2009/0260016 | A1 * | 10/2009 | Ramakrishnan et al. | 718/105 |
| 2010/0036862 | A1 * | 2/2010 | Das et al. | 707/101 |
| 2010/0106934 | A1 * | 4/2010 | Calder et al. | 711/173 |
| 2010/0235348 | A1 * | 9/2010 | Baby et al. | 707/715 |

OTHER PUBLICATIONS

"BMC Loadplus for DB2", BMC Software, Inc., Mar. 31, 2006, pp. 1-2.
"DB2 Version 9.1 for z/Os: Utility Guide and Reference", Ch. 16, IBM Corp., 2008, pp. 205-306 (120 pages).

* cited by examiner

*Primary Examiner* — Taelor Kim (57) ABSTRACT

A balancing technique allows a database administrator to perform a mass data load into a relational database employing partitioned tablespaces. The technique automatically balances the usage of the partitions in a tablespace as the data is loaded. Previous definitions of the partitions are modified after the loading of the data into the tablespace to conform with the data loaded into the tablespace.

19 Claims, 4 Drawing Sheets

BALANCING DATA ACROSS PARTITIONS OF A TABLE SPACE DURING LOAD PROCESSING

BACKGROUND

This disclosure relates generally to the field of computer databases. More particularly, but not by way of limitation, it relates to a technique for balancing data across partitions of a table space when loading data into the table space.

Computer databases have been an important part of enterprises for decades. Two major types of computer databases are hierarchical databases and relational databases. Hierarchical databases, which were developed prior to relational databases, are arranged into tree-like hierarchical structures representing logical relationships. Relational databases organize data into tables of rows and columns. One common relational database management system (DBMS) is the DB2® database system marketed by International Business Machines Corporation (IBM). (DB2 is a registered trademark of IBM.)

The actual data for a relational database is kept in a storage location generally referred to as a tablespace. A tablespace is the physical portion of the database used to allocate storage for managed segments of the database, which are the database objects such as tables and indices. Tablespaces may be physically stored in files in a filesystem defined by an operating system, or may be stored directly over devices.

Some DBMSs, including DB2 systems, allow tablespaces to be partitioned into areas or partitions for performance or other management reasons. Typically, partitioned tablespaces only contain a single table, while non-partitioned tablespaces may contain multiple tables. Customers may partition tablespaces according to values in columns corresponding to database keys. The customer generally specifies key value limits for each partition at tablespace definition time, sometimes known as LIMITKEYs. These LIMITKEYs are typically specified as the highest key value that can be stored in a partition. As data is inserted or loaded into the tables, data with key values are stored in a partition chosen by the relationship of the key values with the collection of LIMITKEYs defined for the partitions of the tablespace. The LIMITKEY value for the last partition is ignored in some implementations, avoiding the possibility that some table data could not be inserted into any partition if the LIMITKEY value for the last partition is less than the highest actual key value in the data.

If the customer chooses key value limits that do not match the data that is to be stored in the tables of the tablespace, then database performance problems may arise. For example, the tablespace may have much more data in one partition than others, because of an imbalance of key values in the data. When such problems arise, such as after a large number of updates to the database, the customer may need to reorganize the database to resolve the performance problems by balancing the partitions.

This problem is particularly an issue in situations where the customer is performing a mass data load into a database, such as to replace an existing set of rows. In such a replacement situation, the existing data in the tablespace is removed, and the new data is inserted as a mass insert. In such a situation, the LIMITKEYs defined for the tablespace partitions, although they may have been appropriate for the previous data, may no longer match the replacement data. However, customers have had no way to repartition the tablespace as a part of the loading process, leading some customers to follow a load process with an immediate reorganization of the database, which increases the time during which the tablespace is typically unavailable for use.

SUMMARY

In one embodiment, a method is disclosed. The method comprises receiving a request to load data into a plurality of partitions of a table of a relational database of a computer system, reading a plurality of data records, each data record having a key value, distributing the plurality of data records evenly across the plurality of partitions, without regard to key value limits defined for the plurality of partitions, and modifying the key value limits defined for the plurality of partitions responsive to the plurality of data records distributed evenly across the plurality of partitions.

In another embodiment, a computer readable medium is disclosed. The computer readable medium has instructions stored thereon, wherein the instructions cause the computer system to perform the method disclosed above.

In yet another embodiment, a networked computer system is disclosed. The networked computer system comprises a plurality of computers communicatively coupled, at least one of the computers programmed to perform a least a portion of the method disclosed above, wherein the entire method disclosed above is performed collectively by the plurality of computers.

In yet another embodiment, a computer system is disclosed. The computer system comprises a processor, a first data store, operatively coupled to the processor, a database, stored in the first datastore, data record source, operatively coupled to the processor, and a program datastore, operatively coupled to the processor. The database comprises a table space. The table space comprises a plurality of partitions configured to store data records, each data record having a key value, and a plurality of key value limits, each associated with a partition of the plurality of partitions, wherein the key values of the data records stored in each partition of the plurality of partitions are no greater than the associated key value limit. The program datastore is configured to store programs that when executed, cause the processor to perform acts. The acts comprise receiving a request to load data into the plurality of partitions, reading a plurality of data records from the data record source, each data record having a key value, distributing the plurality of data records evenly across the plurality of partitions, without regard to the plurality of key value limits, and modifying the key value limits responsive to the plurality of data records distributed evenly across the plurality of partitions.

DETAILED DESCRIPTION

Disclosed implementations include methods and systems for distributing data evenly across partitions while performing a mass data load irrespective of existing key value limits, then assigning appropriate key value limits based on the data actually loaded into the partitions. Such implementations offer partitions that do not need a reorganization to provide the performance benefits of balanced partitions.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts are understood to reference all instance of subscripts corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although the following description is written in terms of an IBM DB2 database, the present invention is not so limited, and the techniques described herein may be used to perform a mass load of data into any relational database that uses partitioned tablespaces. In addition, although the following is written in terms of a mass replacement of data in a partitioned tablespace, the techniques described herein may be used for loading data into an empty partitioned tablespace.

Figure 1:
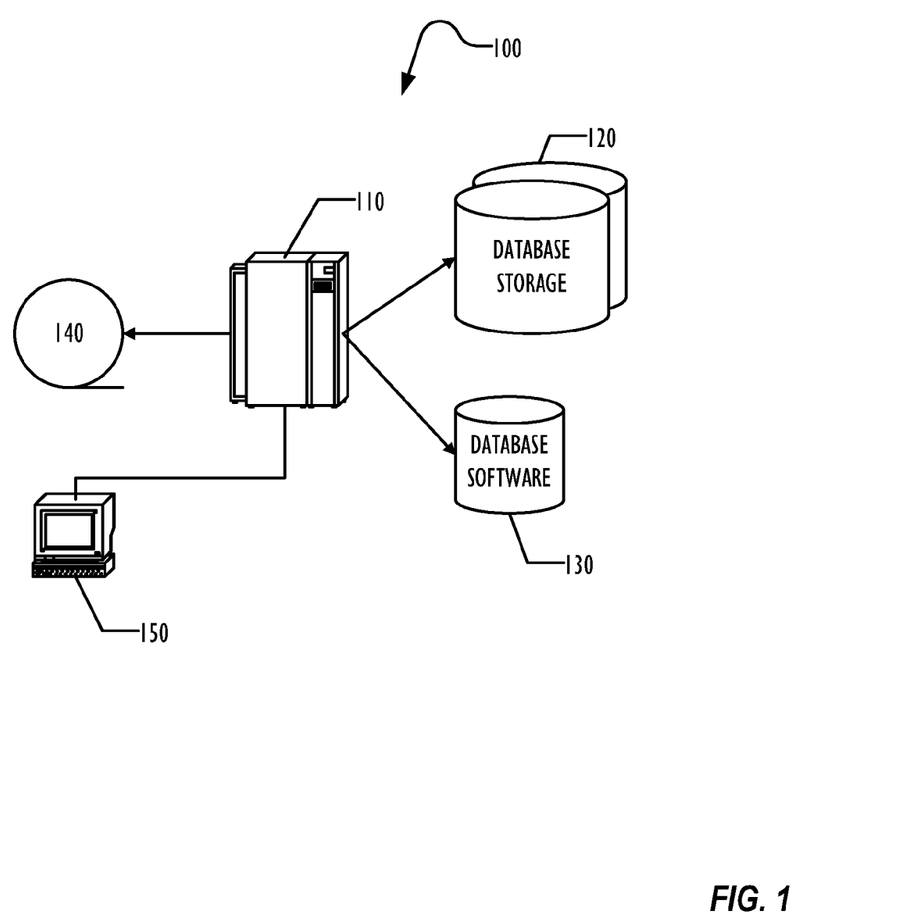
FIG. 1 shows, in block diagram form, an example of a computer system for managing a database according to one embodiment.

FIG. 1 is a block diagram illustrating a system 100 for managing a relational database system according to one embodiment. A mainframe 110 executes a relational database software to manage a relational database stored on datastore 120. The relational database software is stored on a program datastore 130. The relational database software may be a collection of database software modules, some of which may be provided by a first vendor and some of which may be provided by a second vendor. For example, in one embodiment, employing a DB2 database, the DB2 software is provided by IBM and software to perform a mass replacement of data in a tablespace is provided by BMC Software, Inc., under the name BMC LoadPlus® (LOADPLUS is a registered trademark of BMC Software, Inc.). Other third parties may provide software that loads data into DB2 databases, including Computer Associates, Inc. and CDB Software, Inc. In other database management systems, all of the database software is provided by a single vendor.

The datastore 120 providing storage for the relational database may provide storage for multiple DB2 databases and other desired data, and may be implemented as one or more physical units or logical units allocated on physical units. Datastore 120 may be directly connected to the DB2 database software computer system 110 or may be remotely connected, such as via a storage area network (SAN). Data may be loaded into the database from tape unit 140 or from any other source of data, including other computer systems communicatively coupled to the computer system 110. A database administrator (DBA) may submit a request to perform operations on databases stored in the datastore 120 from another computer system, such as a workstation or terminal 150 communicatively coupled to the computer system 110.

Conventional features of the computer system 110 are omitted from FIG. 1 for clarity, but one of ordinary skill in the art will understand that it comprises at least one processor and frequently more than one processor, memory, input/out devices, and storage devices, including, but not limited to, all forms of optical and magnetic storage elements including solid-state storage, including removable media for storage of programs and data. In some embodiments, it may also comprise one or more network interfaces, displays, and user interaction elements such as a keyboard, mouse, and other conventional hardware features such as devices for use with removable media. The computer system 110 is typically of a class of computers known in the art as mainframe computers, running the z/OS® operating system and the DB2 database management system software, but may be any computer capable of managing a relational database as described below. (z/OS is a registered trademark of the International Business Machines Corporation.)

Other client and server computer systems may be connected to the computer 110 to use or control databases stored in datastore 120, using any communications or operative coupling technique known to the art, but are omitted from the drawing for clarity.

Figure 2:
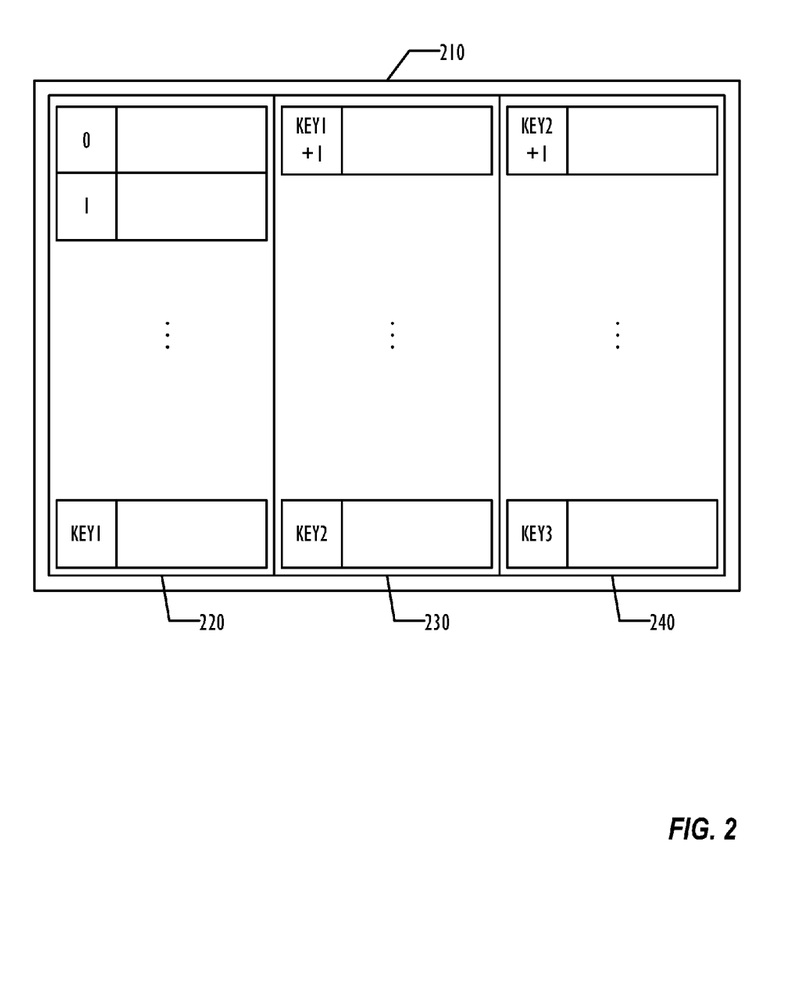
FIG. 2 shows, in block diagram form, an embodiment of a table in a tablespace that is partitioned into a plurality of partitions.

FIG. 2 is a block diagram illustrating a logical view of a partitioned tablespace 210 according to one embodiment. A tablespace is a group of tables, each table of which is a collection of data records organized by rows and columns. In a partitioned tablespace, the single table in the tablespace may be divided into multiple partitions, which may be stored separately. Although a table may be partitioned into partitions, the partitions behave generally as if they formed a single table. In this example, tablespace 210 includes a table that is partitioned into three partitions 220, 230, and 240. Partition 220 has been assigned a key value limit of KEY1, partition 230 has been assigned a key value limit of KEY2, and partition 240 has been assigned a key value limit of KEY3. Thus, partition 220 may contain data rows with key values ranging from an initial minimum value to KEY1, partition 230 may contain data rows with key values ranging from a next value above KEY1 to KEY2, and partition 240 may contain data rows with key values ranging from a next value above KEY2 to KEY3. In some embodiments, the key value limit for the last partition 240 is ignored. The key values may be any key value allowed for a key by the DBMS, including non-numeric keys according to some pre-defined collating sequence, but for ease of the following discussion, the key values are described herein as if they were integer values beginning with 0, thus the first possible key value would be 0 and the next key value after KEY1 would be KEY1+1, for example. The number of partitions in FIG. 2 is illustrative and by way of example only, and can be any desired number.

Thus, in the example partitioned tablespace 210 of FIG. 2, partition 220 may contain records with key values ranging from 0 to KEY1, partition 230 may contain records with key values ranging from KEY1+1 to KEY2, and partition 240 may contain records with key values ranging from KEY2+1 to KEY3 (or higher, in embodiments where the LIMITKEY of the last partition is ignored). The key value may be in any column of the table. When individual records are inserted into the database using the conventional database interface for inserting a row into a table, the DBMS will select a partition for the destination of the insertion from the key value. For example, if the key value is KEY1+2, the record is inserted into partition 230.

Figure 3:
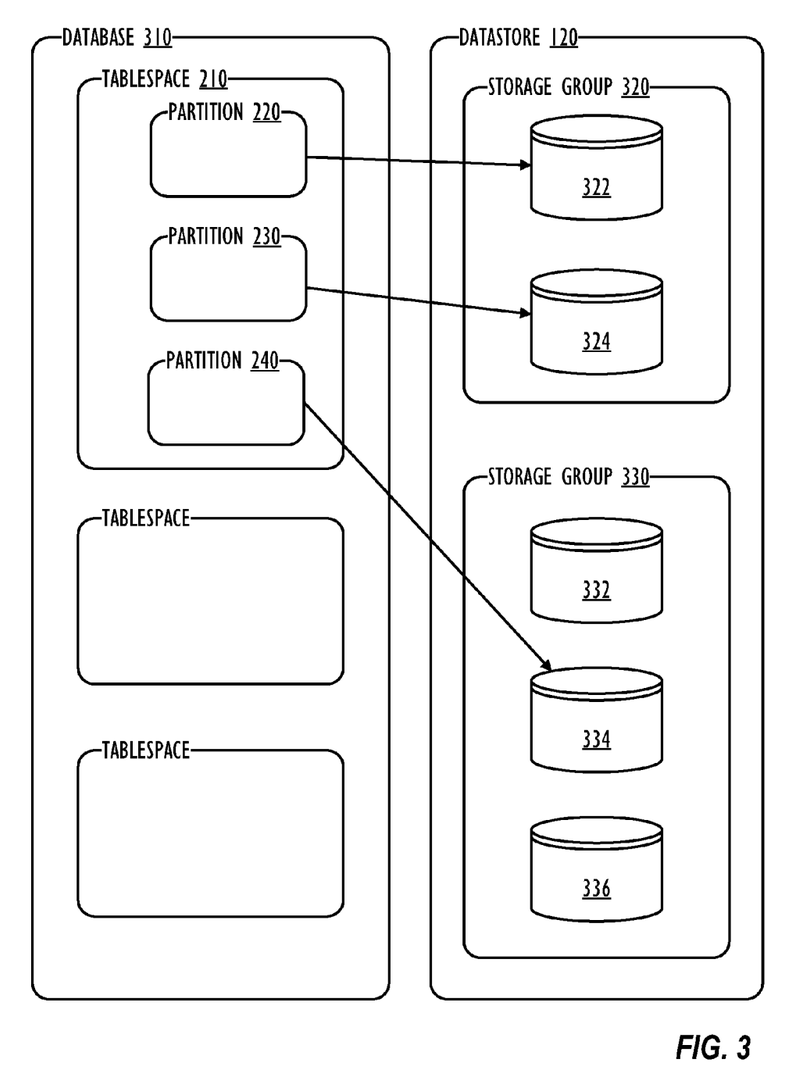
FIG. 3 shows, in block diagram form, an embodiment of a database including the tablespace of FIG. 2.

FIG. 3 is a block diagram illustrating some features of a relational database 310 that includes the tablespace 210 of FIG. 2. The database 310 includes tablespace 210 and may include other tablespaces as desired. Storage for the database 310 is located on datastore 120 as described in FIG. 1. Datastore 120 may be implemented as multiple storage groups, with two storage groups 320 and 330 illustrated as an example in FIG. 3. Each storage group is comprised of one or more storage volumes, which may be physical storage volumes or logical storage volumes defined in a SAN. In the example illustrated in FIG. 3, storage group 320 comprises two physical disc drives 322 and 324, while storage group 330 comprises three physical disc drives 332, 334, and 336. One advantage of partitioning a tablespace is that the storage for the partitions may be split across multiple storage groups and multiple storage volumes. For example, partition 220 may be stored on storage volume 322 of storage group 320, partition 230 may be stored on storage volume 324 of storage group 320, and partition 240 may be stored on storage volume 334 of storage group 330. The allocation of storage volumes and storage groups to partitions and tablespaces is illustrative and by way of example only. By allocating partitions across multiple storage groups and volumes, better performance may be achieved. Although not illustrated in FIG. 3, the database 310 may also include other types of items, such as index spaces that contain indices, which contain pointers to data in tables in tablespaces.

In conventional relational databases using partitioned tablespaces, the LIMITKEY values are determined when the database 310 is created and the tablespace 210 and its partitions 220, 230, and 240 are defined. While the original LIMITKEY values may be acceptable for the data already in the database 310, the DBA for this database 310 may from time to time need or want to reload the data for the database 310. This may happen, for example, when the database 310 stores data that is derived from an external data source that periodically provides a new copy of the external data, which is intended to replace the previous data.

The DBA thus loads the data into the tablespace 210 using a command or other technique for invoking a function to perform a mass data load that replaces the existing data. In an IBM DB2 database, for example, this is typically referred to as a LOAD REPLACE operation. The original data is deleted and the replacement data is loaded as if it were being loaded into empty tables of the database 310, conventionally using an interface similar to the one used for inserting individual rows into the table of the tablespace 210. Thus, the replacement data is placed into partitions 220, 230, and 240 based on the key value in the key column of the row being inserted and the LIMITKEYs defined for the partitions 220, 230, and 240.

As stated above, although the existing LIMITKEY definitions may be acceptable for the database 310 prior to the LOAD REPLACE, the replacement data may not match the original data's distribution of keys. So if performed in the conventional manner, the LOAD REPLACE operation may skew the distribution of data based on the previous LIMITKEY values. For example, if the replacement data consists mostly of data with a key value ranging between KEY2 and KEY3, then most of the replacement data would conventionally be inserted into partition 230, leaving partitions 220 and 240 largely empty. Because the partitioning was done to achieve performance benefits associated with spreading data across multiple partitions, the resulting imbalance after the LOAD REPLACE operation may make the tablespace 210 perform significantly worse than it did before the load. Therefore, some customers may perform a reorganization (REORG) of the database 310 immediately after the LOAD REPLACE, at significant downtime cost.

Figure 4:
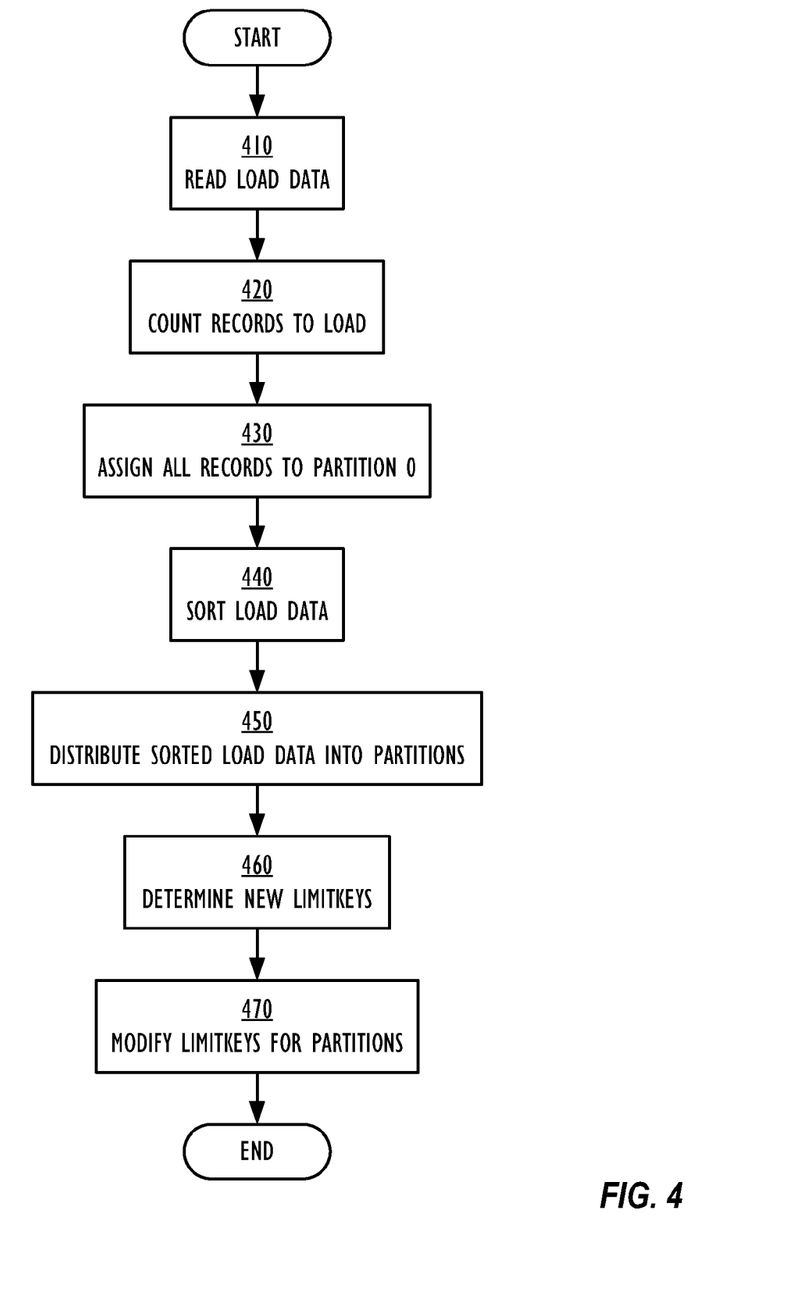
FIG. 4 shows, in flowchart form, a technique for balancing data loaded by a mass data load across a plurality of partitions according to one embodiment.

FIG. 4 is a flowchart illustrating a technique for performing a LOAD REPLACE operation that balances the loaded data across the multiple partitions in a dataspace. In block 410, the data to be loaded into the tablespace 210 is read. The data may be provided using any form of storage media, including any form of magnetic and optical media, and may be provided by an external source through a communications link to the computer 110.

As the data is read, a running count may be kept, so that in block 420 the number of rows or records that are to be loaded into the database is obtained. Then in block 430, in one embodiment all of the records are assigned to the first partition, typically designated partition 0. Other embodiments may assign the records to a partition other than the first partition, as desired. The data is then sorted in block 440 by the key value contained in each record of the data, so that the data may be loaded into the database 310 in key sequence order. After the data is sorted, the data may be distributed across the defined partitions 220, 230, and 240 in block 450.

Instead of using the conventional interface for inserting a single record into the database 310, in one embodiment the loading of records into the database 310 uses software dedicated to a mass load. Because the number of records to be loaded was previously determined, and the number of partitions defined in the tablespace 210 is also known, the number of records to be loaded into each partition 220, 230, and 240 may be determined by a simple division of the number of records by the number of partitions. Thus, in the example of FIG. 2, if the new data loaded into the tablespace 210 comprises 30,000 records, each getting loaded into a row of a table in the tablespace 210, then 30,000/3=10,000 rows may be created in each of partitions 220, 230, and 240.

During the distribution of records into the partitions 220, 230, and 240, the currently defined pre-existing LIMITKEY values are ignored. Thus, records that would be inserted in the conventional technique into one partition may instead be inserted into another partition. For example, depending on the distribution of key values in the data to be loaded, a row with a key value of KEY1 may be loaded into partition 230, even though if added by a normal row insertion action, it would be inserted into partition 220.

The result is a tablespace 210 where the partitions are evenly balanced, typically with a similar amount of free space in each partition 220, 230, and 240. But at this stage, the partitions are logically inconsistent, because they may contain rows with key values that are above the LIMITKEY defined for that partition. Because the data loaded as described above potentially contains records with key values that were outside the range of key values defined by the previous LIMITKEY values in the partitions, it is possible that records may be loaded into the database with the mass LOAD REPLACE technique that could not be inserted into the database using the conventional single-row insertion interface, if the LIMITKEY value for the last partition is not ignored. For example, partition 220 may now contain rows with key values ranging from 0 to KEY1−10, partition 230 may now contain rows with key values ranging from KEY1−9 to KEY3, and partition 240 may now contain rows with key values ranging from KEY3+1 to KEY4, each of which may violate the key value limits previously assigned to each partition.

As the data is distributed into the table of the tablespace 210, the actual value of the highest key in each partition may be recorded in block 460. Then in block 470, the partition definitions may be modified to update the LIMITKEY values of each partition to reflect the actual key values contained in the partitions. Thus, partition 220 may be modified to have a LIMITKEY of KEY1−10, partition 230 may be modified to have a LIMITKEY of KEY3, and partition 240 may be modified to have a LIMITKEY of KEY4, using the example distribution described above.

This action is repeated for each partition of the tablespace. In one embodiment, the DBMS may require that LIMITKEYs of partitions be monotonically increasing. Any modification of LIMITKEY values in such an embodiment must preserve the pre-existing ordering of LIMITKEYs. In such an embodiment, the LIMITKEY of the last partition may be updated first, successively modifying the LIMITKEYs for each predecessor partition. Alternately, the LIMITKEY values may be assigned to partitions in any order, as long as no LIMITKEY is assigned that would be higher than the LIMITKEY of a successor partition. For example, depending on the data actually loaded into the partitions and the LIMITKEY values previous assigned to those partitions, the reassignment of LIMITKEYs may need to be in a non-sequential order of partition numbers to preserve the pre-existing ordering of LIMITKEYs.

If the partition has any free space after distribution of the data into the partition, then future insertions of data may be performed into the partition when the key value of the inserted data is less than (or, when non-unique key values are allowed, less than or equal to) the new LIMITKEY value.

In an alternative embodiment, instead of setting LIMITKEY values to match the records actually loaded into each partition after loading, a simulation of the loading may be performed and the LIMITKEYs determined and updated prior to the actual loading of the data into the partitions. Such a simulation technique would typically take longer to complete than a non-simulation technique, however.

In an alternative embodiment, instead of updating the LIMITKEY values to the highest key loaded into each partition, the LIMITKEY value may be updated to the immediate predecessor of the first key value stored in the next partition. Only in the case of the last partition would the LIMITKEY value be determined by the value of the highest key loaded into that partition. In such an embodiment, if the key values of the data records loaded into the partitions are not consecutive values, the LIMITKEY value determined from the first record in the successor partition may be a higher value than the key value of the last record in the partition whose LIMITKEY is being updated.

In yet another alternative embodiment, instead of setting LIMITKEY values as the highest value actually loaded into each partition, a LIMITKEY value may be selected that is any key value from the highest key of any record loaded into the partition to a predecessor value to the lowest key of any record loaded into the next partition, inclusive.

In one embodiment, the balancing technique described above is optionally performed, by specification of a keyword or other indication on the LOAD REPLACE command or other similar interface for initiating the mass data load. In some embodiments, a DBA may specify other options or parameters for the mass data load that are incompatible with the balancing technique. For example, if the DBA specifies that no sorting of the input data is to be performed, that may preclude the use of the balancing technique.

In one embodiment, the balancing technique may be considered a two-phase technique, with blocks 410 through 440 performed in phase 1, and the remaining actions in phase 2. In phase 1, as the input data is read and records counted, the input data may be copied to a temporary intermediate storage area, then in phase 2 the temporary storage area is read and used as input for the remaining actions. In one embodiment, a DBA may specify that a one-phase technique be employed, where the data is to be written to the tablespace 210 without the use of a temporary storage area. In such an embodiment, the balancing technique may not be performed, and a technique similar to the conventional insertion technique may be used.

Before the availability of the balancing technique described above, DBAs may have used a database reorganization to achieve balancing of the data across partitions. Vendors of database software recognize that some customers may perform LOAD REPLACE actions, then immediately follow up the LOAD REPLACE with a reorganization, to obtain balanced partitions and other benefits. Alternately, some DBAs have resorted to doing a first LOAD REPLACE, determining the proper LIMITKEYs after the data is loaded, then modifying the partitions with new LIMITKEYs and redoing the LOAD REPLACE. By employing the balancing technique during the LOAD REPLACE operation, the need for a separate reorganization or additional loads may be avoided, potentially reducing the amount of time that the tablespace is unavailable for normal operations.

Thus, by first loading data into a tablespace without regard to the LIMITKEY values, then resetting the LIMITKEY values to match the actual data distribution in the partitions, a partitioned tablespace that is balanced corresponding to the actual data stored in the database may be achieved without the need for multiple LOADs or a LOAD followed by a REORG.

In some situations, such as where the amount of data to be loaded into the database is small relative to the number of partitions, the technique described above may produce a collection of partitions with LIMITKEYs that are closer to each other than desired. For example, if the data to be loaded contained only as many records as the number of partitions, and those records had consecutive key values, each partition might be loaded with a single data record, and the LIMITKEYs would be set to consecutive values. Later insertions of data into the database might then result in a very skewed distribution of records across partitions, with significant unusable empty space in all but the last partition. In one embodiment, if the LIMITKEYs for the set of partitions after the LOAD REPLACE are closer than a predetermined separation value, the LOAD REPLACE may be automatically or optionally rolled back, restoring the database to its state before the LOAD REPLACE.

The above has been described in terms of table spaces where data is loaded into partitions in a monotonically increasing order of key values. Some DBMS, such as DB2, may also allow for table spaces that store records in a monotonically decreasing key value order. The LIMITKEY value remains the highest key value allowed for each partition, but in this configuration, partitions have LIMITKEY values that decrease instead of increase by partition number. Similar techniques as have been described above may be used to reload data into such partitions and to reassign LIMITKEYs for those partitions in monotonically decreasing order, preserving the pre-existing ordering of LIMITKEYs, even though their values change.

Various changes in the components as well as in the details of the illustrated operational method are possible without departing from the scope of the following claims. For instance, the illustrative system of FIG. 1 may be comprised of more than one computer communicatively coupled via a communication network. Such a network may be composed of one or more local area networks, one or more wide area networks or a combination of local and wide-area networks. In addition, the networks may employ any desired communication protocol and may, further, be "wired" or "wireless." In addition, acts in accordance with FIG. 4 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method comprising:
   receiving a request to load data into a plurality of partitions of a table of a relational database of a computer system;
   reading a plurality of data records, each data record having a key value;
   loading the plurality of data records evenly across the plurality of partitions by:
      sorting the plurality of data records by key value,
      after the sorting, determining a quantity of records of the plurality of data records to be loaded into each partition of the plurality of partitions by dividing a count of the plurality of data records by a count of the plurality of partitions, and
      writing the plurality of data records into the plurality of partitions, without regard to currently defined key value limits for the plurality of partitions, so that each partition includes the quantity of data records; and
   in response to loading the plurality of data records, modifying the currently defined key value limits for the plurality of partitions by:
      selecting the partition with a highest partition number,
      setting the key value limit for the selected partition, comprising:
         setting the key value limit for the selected partition to a highest key value stored in the selected partition, and
         selecting the partition with a next lower partition number, and
      repeating the act of setting the key value limit for the selected partition for all remaining partitions of the plurality of partitions.

2. The method of claim 1, further comprising counting the plurality of data records as they are read.

3. A method comprising
   receiving a request to load data into a plurality of partitions of a table of a relational database of a computer system;
   reading a plurality of data records, each data record having a key value;
   loading the plurality of data records evenly across the plurality of partitions by:
      sorting the plurality of data records by key value,
      after the sorting, determining a quantity of records of the plurality of data records to be loaded into each partition of the plurality of partitions, and
      writing the plurality of data records into the plurality of partitions, without regard to currently defined key value limits for the plurality of partitions, so that each partition includes the quantity of data records; and
   in response to loading the plurality of data records, modifying the currently defined key value limits for the plurality of partitions by:
      selecting a partition of the plurality of partitions,
      setting the key value limit of the selected partition using a lowest key value stored in an adjacent partition to the selected partition,
      selecting a previously unselected partition of the plurality of partitions, and
      repeating the act of setting the key value limit of the selected partition and the act of selecting an unselected partition of the plurality of partitions for all remaining partitions of the plurality of partitions so that a pre-existing order of the key value limits is preserved.

4. The method of claim 3, wherein the act of modifying the currently defined key value limits further includes:
   for a partition with a highest partition number, setting the key value limit to a highest key value of a data record stored in the partition with the highest partition number.

5. The method of claim 3, wherein setting the key value limit of the selected partition using the lowest key value stored in the next partition comprises:
   setting the key value limit to a predecessor value of the lowest key value of a data record stored in the adjacent partition of the plurality of partitions.

6. The method of claim of claim 3, wherein the act of setting the key value limit for the selected partition comprises:
   setting the key value limit to a value between a highest key value of a data record stored in the selected partition and a lowest key value of a data record stored in the adjacent partition of the plurality of partitions.

7. A non-transitory computer readable storage device with instructions for a computer system stored thereon wherein the instructions cause the computer system to perform the method of claim 1.

8. A networked computer system comprising:
   a plurality of computers communicatively coupled, at least one of the plurality of computers programmed to perform at least a portion of the method of claim 1 wherein the entire method of claim 1 is performed collectively by the plurality of computers.

9. A computer system, comprising:
   a processor;
   a first datastore;
   a database, stored in the first datastore, comprising:
      a tablespace, comprising:
         a plurality of partitions configured to store data records, each data record having a key value; and
         a plurality of key value limits, each associated with a partition of the plurality of partitions, wherein the key values of the data records stored in each partition of the plurality of partitions are no greater than the associated key value limit;
   a data record source, operatively coupled to the processor; and a program datastore, operatively coupled to the processor, configured to hold programs that when executed, cause the processor to perform acts comprising:
- receiving a request to load data into the plurality of partitions;
- reading a plurality of data records from the data record source, each data record having a key value;
- sorting the plurality of data records by key value,
- after the sorting, determining a quantity of records of the plurality of data records to be loaded into each partition of the plurality of partitions by dividing a count of the plurality of data records by a count of the plurality of partitions, and
- writing the data records into the plurality of partitions, without regard to currently defined key value limits for the plurality of partitions, so that each partition includes the quantity of data records; and
- in response to writing the plurality of data records into the plurality of partitions, modifying the currently defined key value limits by:
  - selecting a partition of the plurality of partitions,
  - setting the key value limit for the selected partition, preserving a pre-existing order of the key value limits of the plurality of partitions,
  - selecting a previously unselected partition of the plurality of partitions, and
  - repeating the act of setting the key value limit for the selected partition and selecting another previously unselected partition for all remaining partitions of the plurality of partitions.

10. The computer system of claim 9, wherein setting the key value limit of the selected partition comprises:
- determining a highest key value of a data record distributed into the selected partition of the plurality of partitions; and
- setting the key value limit for the selected partition to the highest key value.

11. The computer system of claim 9, wherein setting the key value limit of the selected partition comprises:
- determining a lowest key value of a data record distributed into an adjacent partition of the selected partition; and
- setting the key value limit for the selected partition of the plurality of partitions based on the lowest key value.

12. The computer system of claim 11, wherein setting the key value limit of the selected partition comprises:
- setting the key value limit to a predecessor value of the lowest key value.

13. The computer system of claim 11, wherein setting the key value limit for the selected partition comprises:
- setting the key value limit to a value between a highest key value of a data record stored in the selected partition and the lowest key value of the data record stored in the adjacent partition.

14. The computer system of claim 11, wherein modifying the key value limits for each partition further includes:
- for a last partition, setting the key value limit to a highest key value of a data record stored in the last partition.

15. The computer system of claim 11, wherein the key values are monotonically decreasing and the adjacent partition is a predecessor partition.

16. The computer system of claim 9, wherein reading the plurality of data records includes counting the plurality of data records as they are read.

17. A non-transitory computer readable storage device with instructions for a computer system stored thereon wherein the instructions cause the computer system to perform the method of claim 3.

18. The method of claim of claim 3, wherein the key values of the data records are monotonically decreasing and the adjacent partition is a predecessor partition.

19. The method of claim of claim 1, further comprising:
- determining whether a difference between a first updated limit key of a first partition and a second updated limit key of a successor partition is less than a predetermined value; and
- rolling back the writing of the records when the difference is less than the predetermined value, so that the database is restored to a state prior to loading the plurality of data records.

* * * * *